UNITED STATES PATENT OFFICE.

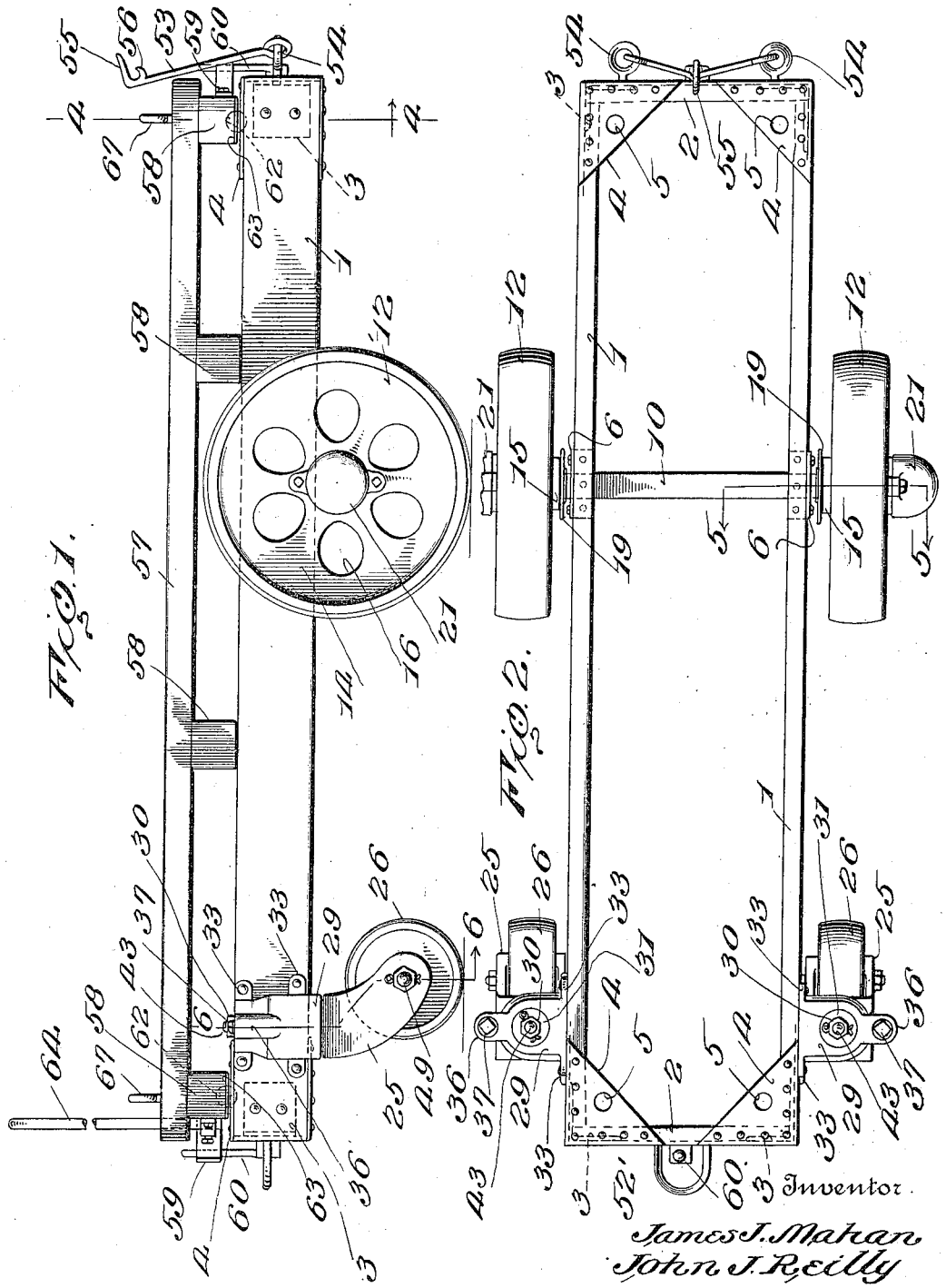

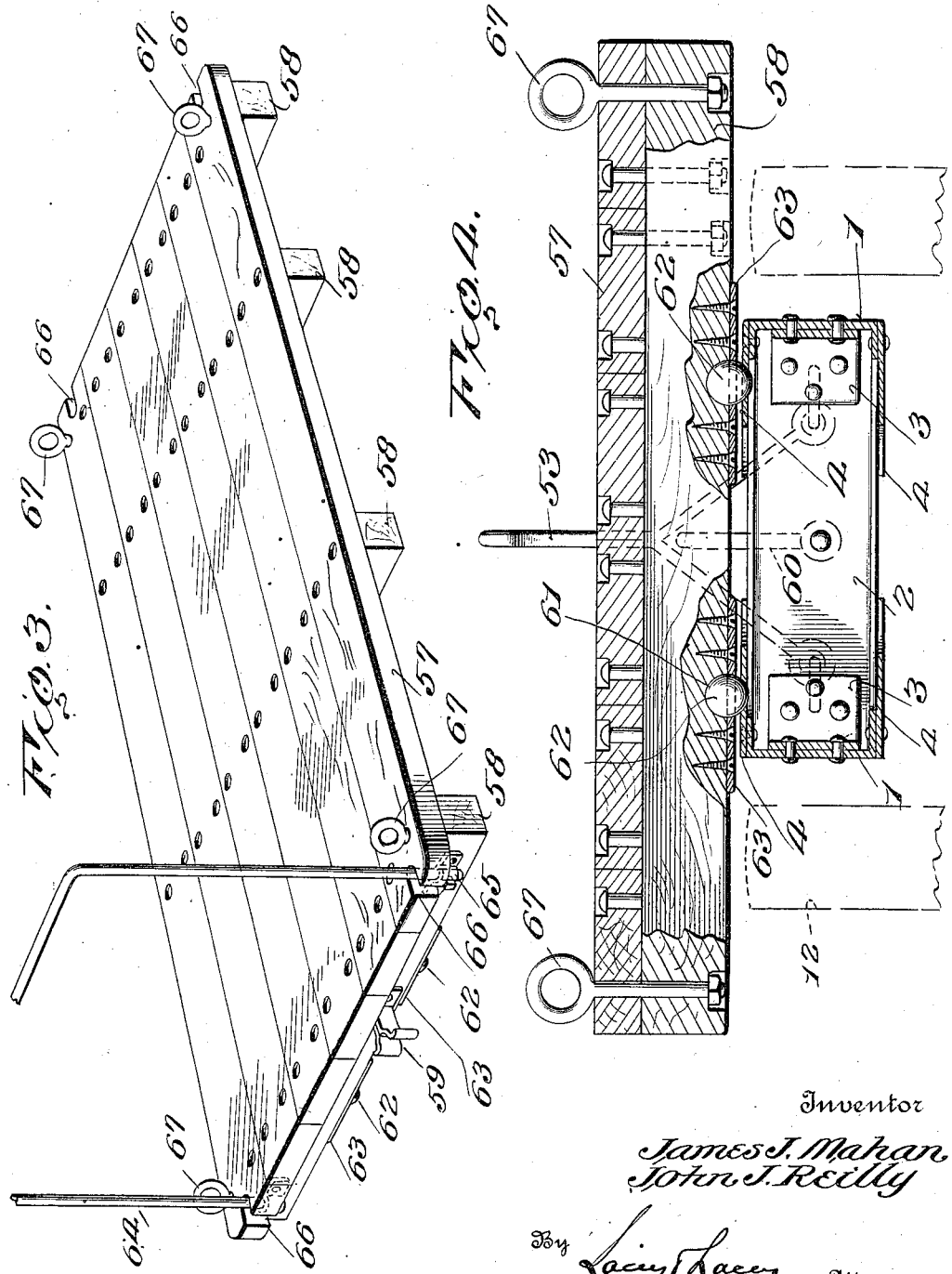

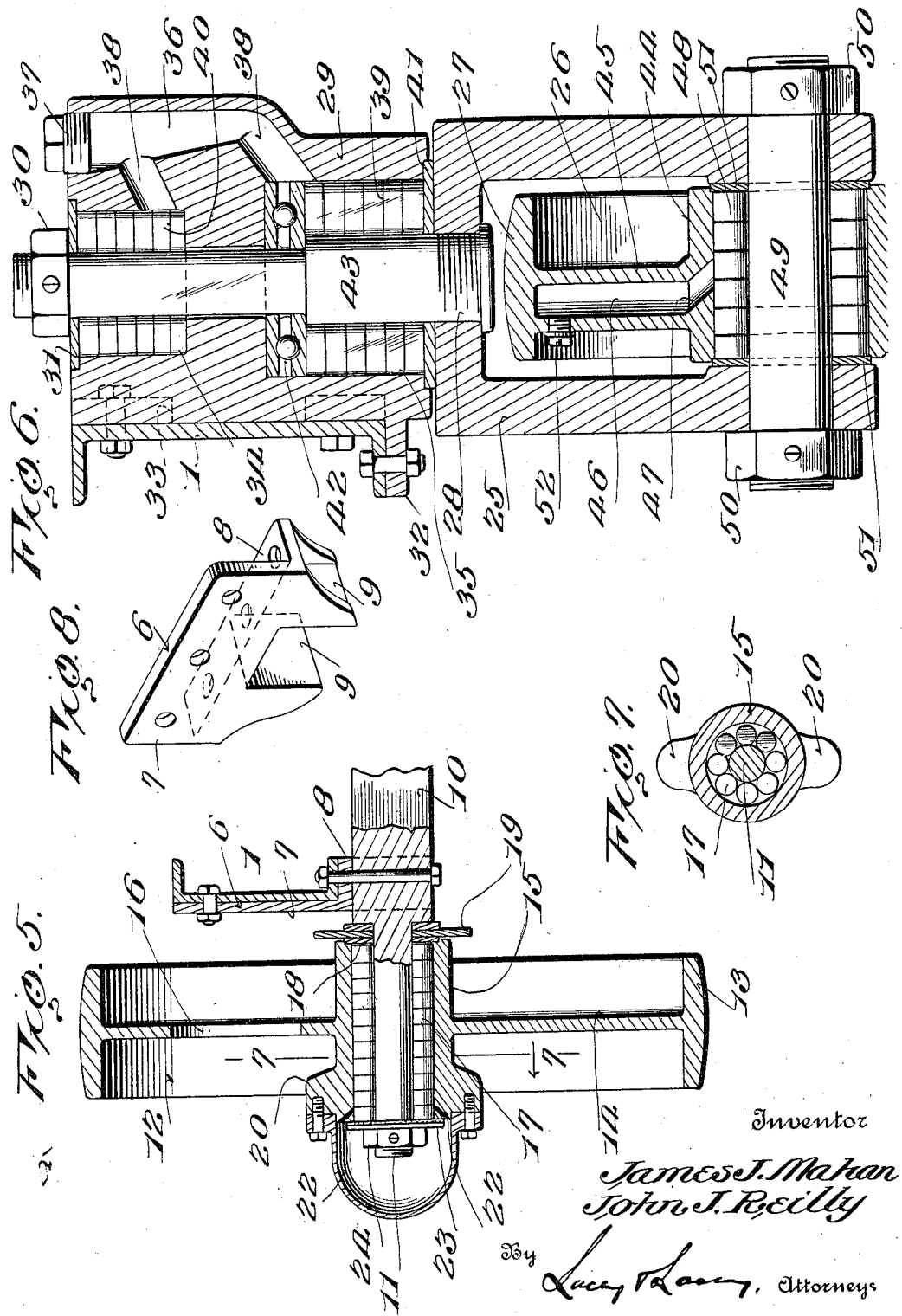

JAMES J. MAHAN AND JOHN J. REILLY, OF JERSEY CITY, NEW JERSEY.

TRAILER-TRUCK.

1,310,028. Specification of Letters Patent. Patented July 15, 1919.

Application filed April 23, 1918. Serial No. 230,339.

*To all whom it may concern:*

Be it known that we, JAMES J. MAHAN and JOHN J. REILLY, citizens of the United States, residing at Jersey City, in the county of Hudson and State of New Jersey, have invented certain new and useful Improvements in Trailer-Trucks, of which the following is a specification.

Our invention relates to trucks and has for its object the provision of a truck especially adapted for use as a trailer with tractors or motor driven vehicles. The invention seeks to provide a truck which will follow in the track or path of the tractor and may be employed in trains, each truck following directly in the path traveled by the preceding truck. The invention also seeks to provide a truck from which the platform or load supporting bed may be removed with the load thereon and transferred to a car or vessel so that the load of merchandise need not be handled except in bulk. The invention also seeks to improve generally the construction, arrangement, and operation of the truck to the end that the cost of production may be reduced and the durability and usefulness of the truck increased.

A truck embodying our improvements is illustrated in the accompanying drawing and the invention resides in certain novel features which will be pointed out in the claims following the description.

In the drawings:

Figure 1 is a side elevation of a truck constructed in accordance with our invention.

Fig. 2 is a plan view of the same with the platform or load carrying bed removed.

Fig. 3 is a perspective view of the platform removed from the truck.

Fig. 4 is a transverse section taken on the line 4—4 of Fig. 1.

Fig. 5 is a transverse vertical section taken on the line 5—5 of Fig. 2.

Fig. 6 is an enlarged vertical section of the caster taken on the line 6—6 of Fig. 1.

Fig. 7 is a detail section on the line 7—7 of Fig. 5.

Fig. 8 is a detail perspective view of the bracket which serves as a coupling between the frame or chassis of the truck and the axle.

In carrying out our invention, we employ a frame consisting of side bars 1 and end bars 2 of channel iron which are rigidly connected at their extremities by brackets 3 secured to their inner faces as will be readily understood. The frame is further reinforced by gusset plates 4 which are secured upon the flanges of the side and end bars at the ends of the same and eight of said plates are employed, one plate being secured at each angle or corner of the frame on the top of the same and one plate being secured to the frame at each corner thereof on the bottom of the same. As a result of this construction, a very strong rigid and durable frame is produced which will be free of excessive weight. In each of the upper gusset plates 4 we provide an opening 5, the purpose of which will presently appear.

To each side bar 1, at a point in advance of the center thereof, we secure a bracket 6 having an upstanding flange 7 which is adapted to fit against the outer surface of the bar. The bracket is also provided with a web or flange 8 which is adapted to fit against the under side of the side bar. Parallel depending webs or flanges 9 are formed on the under side of the web or flange 8 and these flanges 9 are at right angles to the said web 8 so that an angular recess or notch is produced to receive the angular portion of an axle 10. Suitable openings are provided in the webs 7 and 8 to receive securing bolts whereby the brackets may be secured to the frame and the axle secured in position in the bracket and it will be readily understood that the brackets on the opposite sides of the frame are arranged in transverse alinement so that the axle may be received therein and secured thereto without being twisted or bent. The ends of the axle are reduced and the reduced portions are given a circular cross section so as to form spindles 11 on which the truck wheels 12 may be mounted. The truck wheels are provided with crowned treads, as shown at 13, so that the turning of the truck will be facilitated and the treads of the wheels are preferably formed integrally with the body member 14 and the hub 15 as clearly shown in Fig. 5, openings 16 being provided through the body member so as to avoid unnecessary weight without detracting from the strength of the wheel. The hub 15 is of sufficient internal diameter to be placed over the spindle 11 and permit the interposition of roller bearings 17 between the spindle and the hub as will be readily understood. A fiber washer 18 and a metallic washer 19 are provided at the inner end of the hub around the spindle so as to prevent the entrance of dust or dirt to the roller bearings and the outer end of the hub is constructed with enlargements or lugs 20 to provide a base to which a cap 21 may be secured. This cap 21, as clearly shown in Fig. 5, constitutes a reservoir in which a lubricant may be placed and openings 22 are provided through the end of the hub to permit the flow of said lubricant to the roller bearings so that the wheel may be rotated freely when the truck is in use. To prevent the hub slipping from the spindle and also to retain the roller bearings in place, washers, indicated at 23, are mounted upon the outer end of the spindle and are held to the end of the hub by a nut 24 mounted on the spindle and turned home again against the washers as shown and will be readily understood.

Near its rear end, on each side, we provide the truck with a caster comprising a fork or yoke 25 and a roller or wheel 26 supported within the said yoke or fork, the tread surface of the said roller being arched or crowned, as shown at 27, so as to facilitate the turning of the truck. In the upper end of the yoke or fork 25 is secured a spindle 28 which extends vertically through a head or bearing member 29 and is held in said head or bearing member by a nut 30 mounted upon its upper extremity and turned home against a washer 31 seated in the upper end of said head or bearing member. The head or bearing member 29 is constructed with a horizontal lug or projection 32 which fits against and is secured to the lower flange of the side bar 1 and at the side of the said head or bearing member are lugs 33 which fit against and are rigidly secured to the side bar, as shown in Figs. 1 and 2 and will be readily understood. Upper and lower cavities 34 and 35 are formed within the head 29 and upon the outer side of the head is formed a reservoir 36 to contain lubricant, a plug or cap 37 being fitted to the upper end of said reservoir to close the same and protect the lubricant from dust and dirt, and passages 38 are formed through the head to permit the lubricant to flow from the reservoir through the chambers 34 and 35. The upper portion of the spindle is reduced in diameter and extends through the central portion of the head and through the upper chamber 30 as shown clearly in Fig. 6. Roller bearings 39 are fitted in the lower chamber 35 around the lower portion of the spindle 28 and similar but smaller bearings 40 are fitted around the upper portion of the spindle within the upper chamber 34. The washer 31 extends over the upper end of the roller bearings 40 and a similar washer 41 extends across the lower end of the roller bearings 39 while a thrust bearing 42 is provided in the upper end of the lower chamber 35 and fits between the top wall of said chamber and the annular shoulder 43 of the spindle. It is to be understood that we employ felt or fiber as well as metallic washers at the ends of all bearings so as to exclude dust and dirt from the bearings. The caster wheel 26 is preferably constructed with a hub 44 connected integrally with the tread member by a disk or web 45 and upon the said web or disk is provided a reservoir 46 to receive and hold lubricant, a passage 47 being provided through the hub at the inner end of said reservoir to permit the flow of lubricant to the roller bearings 48 arranged within the hub and around the axle 49 which is secured in the end of the yoke or fork 25 by nuts 50 fitted on the ends of the same and turned home against the sides of the fork or yoke. Fiber and metal washers, indicated at 51, may be fitted upon the axle at the ends of the hub so as to retain the lubricant around the roller bearing and a plug 52 is fitted in the filling opening of the outer wall of the reservoir 46 to prevent loss of lubricant and permit the same to be readily filled when necessary.

To the rear end bar 2 of the truck is secured a bail or eye 52' which is to be engaged by a coupling hook 53 at the front end of a following truck. The said coupling hook is hung freely upon eyes 54 on the front end bar of the frame and is constructed at its free end with a bill 55 of appreciable length so that it will not be readily disengaged from the coupling or eye of the preceding truck in which it is inserted. To hold the coupling hook in engagement with the loop or eye 52' of the advance truck or the corresponding member on the trailer, a tooth or lug 56 is provided on the shank of the coupling hook adjacent the bill 55 so that both sides of the member 52' will be positively engaged by the coupling hook.

The platform or load-carrying bed will preferably be constructed of a plurality of longitudinally disposed planks 57 secured upon transverse beams or braces 58 and upon the outer sides of the end beams or braces 58 we provide catches or hasps 59 which are adapted to be engaged by lever latches 60 hung upon the ends of the truck frame in position to be swung upwardly so that when said latches are in their raised positions they will positively engage the hasps 59 and thereby prevent endwise or longitudinal movement of the platform. The end beams or braces 58 are also constructed with sockets 61 in their under sides and balls 62 are held in said sockets by keeper plates 63 secured to the beams and fitting around the balls as will be readily understood. The balls depend below the keeper plates and, when the platform is in position on the truck, they will enter the openings 5 in the gusset plates 4 and thereby maintain the platform in position on the truck as will be readily understood so that the load will be properly distributed. Moreover, if the platform be lifted from the truck these balls will constitute bearings to permit the platform to be rolled over a floor of a warehouse so that the material will be readily brought to the point in the warehouse where it is to be stored. To retain the load on the platform, we provide the stop frames 64 which are preferably in the form of substantial bails having their ends secured in sockets 65 on the end beams 58 and their sides passing up through notches 66 in the ends of the platform. Eyes, rings or hooks 67 are also provided upon the platform at the corners of the same and these members may be engaged by the ends of cables or chains carried by a derrick or crane so that the loaded platform may be lifted bodily from the truck and carried over and onto a vessel or into a freight car and the merchandise thus stored and transported in bulk without being removed from the platform until it reaches its final destination.

From the foregoing description, taken in connection with the accompanying drawings, it will be seen that we have provided a truck which will travel smoothly and may turn corners freely. By arranging the larger truck wheels in advance and disposing casters at the rear end of the truck we are enabled to employ a long train of trailer trucks over a sinuous path, and experience has demonstrated that each truck will follow the exact path traveled by the preceding truck and will make turns at the same points. The manner in which the wheels are mounted provides for their thorough lubrication so that they are not apt to bind at any time and cause the truck to deviate from the path over which it should travel. The platform will rest firmly upon the truck but may be instantly removed therefrom when desired.

Having thus described the invention, what is claimed as new is:

1. The combination with a truck frame consisting of side and end bars, gusset plates secured on said bars at the ends thereof and having openings therethrough, a platform adapted to extend over the truck frame, and revoluble bearing members mounted on the under side of the platform and adapted to rest in said openings.

2. The combination with a truck frame, of a platform adapted to rest upon and extend over the truck frame and consisting of transverse beams and longitudinal floor members secured on said beams, said floor members being provided with notches at the ends of the platform, interengaging devices upon the truck frame and the platform to retain the platform on the truck frame, sockets on the end transverse beams of the platform vertically below and in alinement with the notches in the floor members, and stop members secured in said sockets and rising above and through the notches in the floor members of the platform.

3. In a trailer, a truck frame consisting of side and end channel bars having their flanges directed inwardly, angle-irons secured to the inner faces of said bars at the ends of the same, gusset plates secured upon the flanges of the bars at the ends thereof, said gusset plates having sockets therein, and a platform adapted to extend over the truck frame and provided with revoluble bearing members in its under side to engage said sockets.

In testimony whereof we affix our signatures.

JAMES J. MAHAN. [L. S.]
JOHN J. REILLY. [L. S.]

Copies of this patent may be obtained for five cents each, by addressing the "Commissioner of Patents, Washington, D. C."